United States Patent [19]
Cromer

[11] 3,790,408
[45] Feb. 5, 1974

[54] BATTERY COIL CONSTRUCTION

[75] Inventor: George P. Cromer, Clay, Fla.

[73] Assignee: General Electric Company, Owensboro, Ky.

[22] Filed: May 30, 1972

[21] Appl. No.: 257,754

Related U.S. Application Data

[62] Division of Ser. No. 78,807, Oct. 7, 1970, Pat. No. 3,695,935.

[52] U.S. Cl. .................................. 136/13, 136/69
[51] Int. Cl. ........................................ H01m 35/16
[58] Field of Search .................. 136/13–14, 44–45, 136/69, 107, 134–135; 29/180 R, 180 SS, 183

[56] References Cited
UNITED STATES PATENTS

| 3,503,806 | 3/1970 | Sugalski | 136/13 |
| 2,536,699 | 1/1951 | Ruben | 137/107 |
| 2,661,388 | 12/1953 | Warner et al. | 136/100 |
| 3,472,696 | 10/1969 | Shoeld | 136/13 |

Primary Examiner—Anthony Skapars
Attorney, Agent, or Firm—Nathan J. Cornfeld et al.

[57] ABSTRACT

An improved cell construction is utilized in which a ruffled edge of the negative plate extends longitudinally beyond the edge of the positive plate at one end of the battery coil and a ruffled edge of the positive plate extends longitudinally beyond the edge of the negative plate at the opposite end of the battery coil. Terminal straps are attached to the extending ruffled edges of the respective plates.

4 Claims, 3 Drawing Figures

PATENTED FEB 5 1974 3,790,408

3,790,408

BATTERY COIL CONSTRUCTION

This application is a division of my co-pending application, Ser. No. 78,807, filed Oct. 7, 1970, patented Oct. 3, 1972, as U.S. Pat. No. 3,695,935.

BACKGROUND OF THE INVENTION

This invention relates to the construction of an electro-chemical cell and more particularly to the type of cell construction in which a negative plate and a positive plate are wound with appropriate separators into a coil.

In Sugalski U.S. Pat. No. 3,503,806 issued Mar. 31, 1970 and assigned to the assignee of this invention there is described and claimed a construction of a battery coil in which one edge of the negative plate longitudinally extends beyond the positive plate at one end of the coil and one edge of the positive plate extends beyond the negative plate at the opposite end of the coil. This type of construction permits ease of construction of the battery coil including the attachment of terminal strips across the exposed edges of the respective plates by a plurality of welds to improve the ohmic connection between the plate and the terminal strap. The plates used in such coils comprise a fairly thin metal substrate upon which the active battery is deposited which, of course, results in an overall increase in the plate thickness. A small portion of the edge to be ultimately exposed is, however, kept free of the active material, among other reasons, to assure a good weld of the plate to the terminal strap. This, however, results in a thin exposed edge which may be bent during construction, cause injury to assemblers due to its thin edge, and in some instances, create misalignment problems during the winding process.

SUMMARY OF THE INVENTION

It is therefore an object of this invention to provide an improved battery coil construction. Other objects of the invention will be apparent from the description and the drawings.

In accordance with the invention and in a specific embodiment thereof an improved battery coil construction is provided comprising a positive plate having one edge thereof ruffled, a negative plate having one edge ruffled, and separator means therebetween. The plates and the separator means are wound into a battery coil with the two plates longitudinally offset from one another so that the ruffled edge of one plate extends beyond the flat edge of the second plate at one end of the coil while the ruffled edge of the second plate extends beyond the flat edge of the first plate at the opposite end of the coil.

DESCRIPTION OF THE PREFERRED EMBODIMENT

Figure 1:
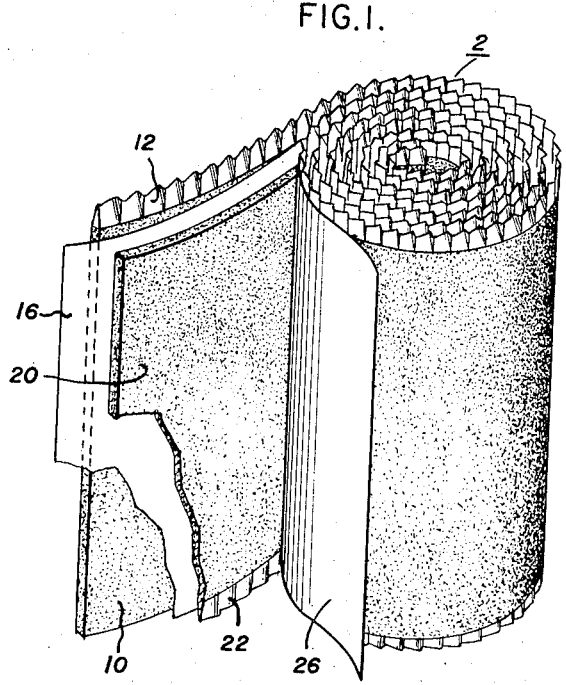
FIG. 1 is a partially cutaway isometric view of the invention.

Referring now to the drawings and particularly to FIG. 1, a battery coil constructed in accordance with the invention is generally illustrated at 2 comprising a positive plate 10, a first separator 16, a negative plate 20, and a second separator 26.

Plates 10 and 20, with separators 16 and 26 therebetween, are spirally wound to form coil 2. Plates 10 and 20 are longitudinally offset from one another, as well as from separators 16 and 26, to provide an extending edge 12 at one end of coil 2 comprising a continuous exposed edge of plate 10 and an extending edge 22 at the opposite end of coil 2 comprising a continuous exposed edge of plate 20.

Figure 2:
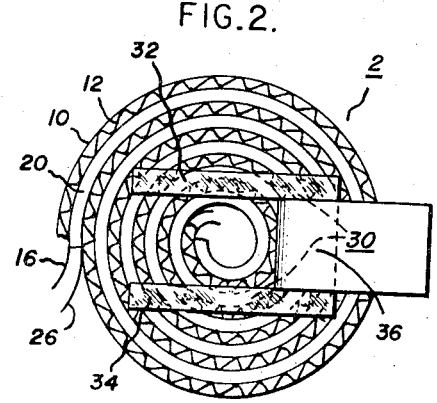
FIG. 2 is an end view of the invention.
Figure 3:
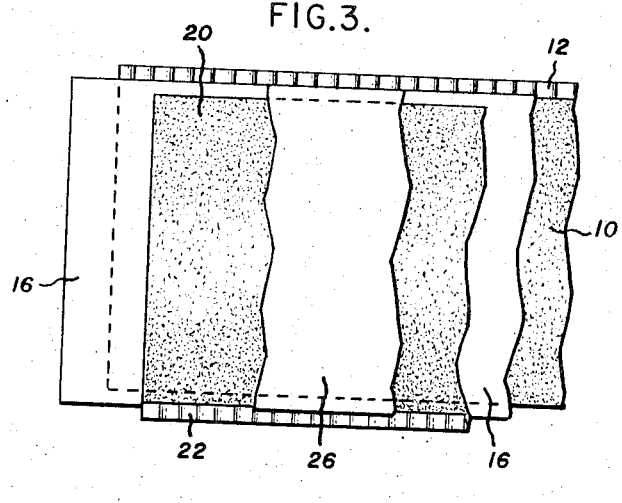
FIG. 3 is a partially cutaway view of a portion of the construction illustrated in FIG. 1.

In accordance with the invention, edges 12 and 22 respectively of plates 10 and 20 are formed with a ruffled or non-linear configuration as best seen in FIGS. 1 and 3. This configuration is used to impart strength to the otherwise thin exposed edge which, in the prior art construction, could be easily bent making subsequent attachment of the terminal strap difficult. The construction also provides, as best seen in FIG. 2, a larger cross-section of the exposed edge available for welding to terminal strip 30. Terminal strip 30 may comprise, for example, two leg portions 32 and 34. Ruffled edge 12 is shown in dotted outline form beneath the leg portions so that the increased cross-sectional area of ruffled edge 12 beneath portions 32 and 34 may be more easily visualized. A raised central portion 36 is subsequently attached to the appropriate positive or negative terminal of the battery as the case may be. The attachment of the terminal straps to the terminals leading to the outside of the battery case form no part of the present invention and are therefore not shown. Attachment of the terminal straps to appropriate terminals carried in a battery casing is illustrated in the previously mentioned Sugalski patent, U.S. Pat. No. 3,503,806 cross-reference to which is hereby made.

While the exact configuration of the ruffled edge may be varied somewhat, for example, the ruffles may be of a corrugated or undulating shape or they may be v-shaped or u-shaped. The overall width of the ruffle preferably should not be greater than the width or thickness of the portion of the plate containing the active material. For example, in a specific embodiment wherein the plate thickness of the portion of the plate containing the active material was about 20–27 mils thick, the ruffled edge (which contains no active material) was about 17–18 mils wide from peak to peak. In this manner, the overall thickness of the plate and the resulting battery coil is not increased. It should be noted here that, in contrast, the plate thickness at the ruffled edge containing no active material is only about 2 mils thick before it is ruffled. Hence the reference to this edge in the prior art construction as a knife-edge.

The ruffled edge on the plate may be formed by placing the plate in a press containing appropriate dies or it may be formed by passing the plate through a pair of rollers having appropriately shaped knurled portions at the point of engagement of the edge portion of the plate containing no active material.

The resulting ruffled edge construction of the battery coil provides added strength to the exposed edge portions of the coil; provides an edge on the plate which is safer for an operator to handle in as much as the thin edge of the plate no longer represents a knife-edge; and the ruffled edge also provides a larger cross-sectional area capable of welding to a terminal strap of given area thus providing more ohmic contact between the plate and the terminal strap to reduce the resistance of the battery at this point. In addition, the construction of the invention provides another benefit in the rolling assembly of the battery coil. In the previous construction, using a thin straight edge on one side of each plate, a plate would occasionally become skewed during the winding process due to the thin edge slipping under the alignment guides which guide the sides of each plate during the rolling operation to insure the desired longitudinally offset of the positive and negative plates with respect to each other and to the separators therebetween. Using the ruffled plates of the invention proper alignment of the plates during the coiling operation is assured due to the effective increase in thickness of the edge of the plate having no active material adhering thereto.

What I claim as new and desire to secure by Letters Patent of the United States is:

1. An improved elongated cell plate, having two opposed edge portions in the direction of elongation, for incorporation in a battery coil comprising a nonruffled main portion containing active material and one of said edge portions having a ruffled end relatively free of active material, said ruffled end of said one edge portion when the plate is in coiled condition defining a plane substantially perpendicular to the axis of a battery coil incorporating the cell plate.

2. The cell plate of claim 1 wherein the overall width from peak to peak of said ruffled end of said one edge portion of each plate is not greater than the thickness of the non-ruffled main portion of each plate containing active material.

3. The cell plate of claim 1 wherein the other of said edge portions is nonruffled.

4. The cell plate of claim 2 wherein the other of said edge portions is nonruffled.

* * * * *